E. L. GILMORE.
MOTION SLIDE FOR STEREOPTICONS.
APPLICATION FILED JAN. 27, 1913.
1,083,679. Patented Jan. 6, 1914.
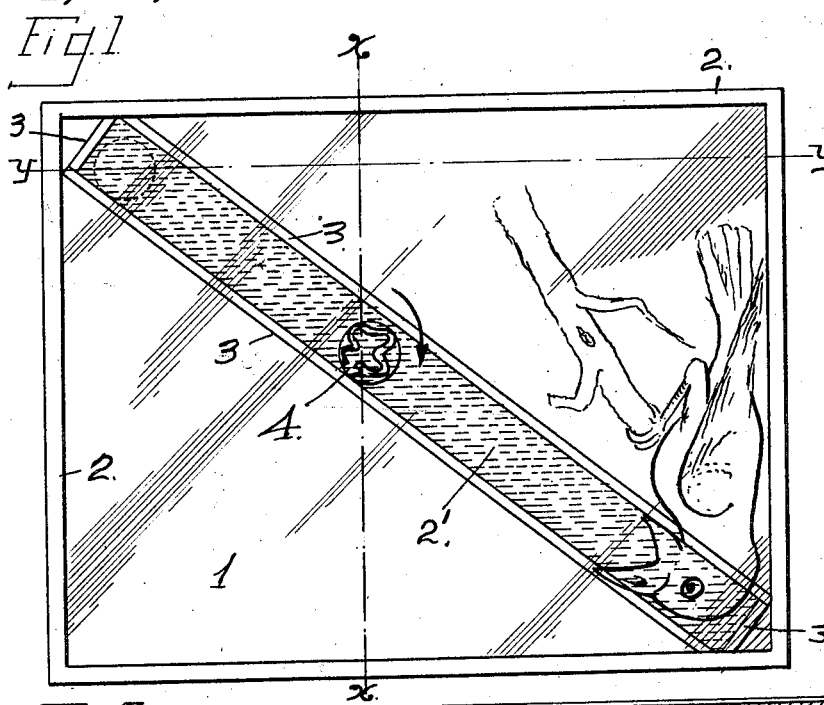
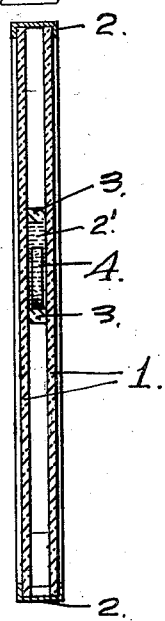
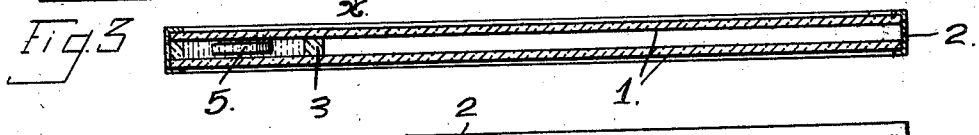
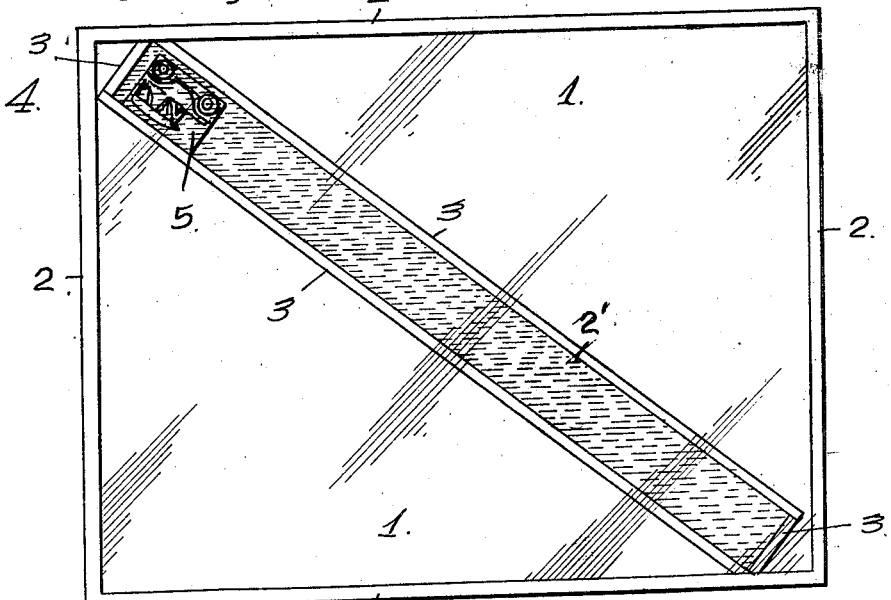

UNITED STATES PATENT OFFICE.

EARL L. GILMORE, OF NAPA, CALIFORNIA.

MOTION-SLIDE FOR STEREOPTICONS.

1,083,679. Specification of Letters Patent. Patented Jan. 6, 1914.

Application filed January 27, 1913. Serial No. 744,538.

*To all whom it may concern:*

Be it known that I, EARL L. GILMORE, a citizen of the United States, and residing in the town of Napa, county of Napa, and State of California, have invented a new and useful Improvement in Motion-Slides for Stereopticons, of which the following is a specification.

My invention relates to motion slides for stereopticons and the like wherein a transparent member, bearing a suitable image to be projected upon a screen, is confined within a viscous, transparent liquid, and its object is to provide means that will retard to a certain extent, the action of gravity on the transparent member so that a gradual downward motion of the said transparent member will be projected and reversed by the focus or reflection of the lens within the stereopticon, to a gradual upward movement on the screen, and its object is to provide a gradual upward motion in pictures or other images that may be projected upon a screen by a stereopticon. I accomplish this feature by means of the device illustrated in the drawings forming a part of the present specification, wherein like numerals of reference refer to similar parts throughout the said specification and drawings, and in which—

Figure 1 is a front elevation of a transparent slide for stereopticons showing a diagonal channel containing a viscous, transparent liquid and a movable, transparent member containing an image thereon, confined within the channel. Fig. 2 is a vertical section taken on the line X—X of Fig. 1. Fig. 3 is a horizontal section taken on the line Y—Y Fig. 1. Fig. 4 is a modification of my invention disclosing a rectangular, transparent member with an image thereon, confined in the viscous liquid.

The numeral 1 is used to designate parallel glass plates bound together with a suitable binder 2. A diagonal channel 2' is formed by means of the transparent strips 3 between the glass plates 1. Within the diagonal channel 2' is confined a circular, transparent, movable member 4 having an image thereon which is adapted to be projected by means of a stereopticon, onto a screen. The channel 2' is filled with a viscous liquid such as glycerin or the like, of such density as to partially retard the action of gravity upon the movable member 4 confined therein.

Inasmuch as all slides must be placed bottom side up within the stereopticon in order to project the image upon the said slide with its top side upon the screen, the image upon the slide must be upside down also. In order to make an image appear upon the screen wherein a portion of the said image appears to be moving upward without any apparent means for propelling the same, I have provided a slide as shown in Fig. 1 of the drawings. On this slide the transparent image of a bird is shown with the head downward or bottom side up. The channel 2' containing a viscous liquid and a circular, transparent, movable member having a transparent image of a worm thereon, is slanted from the upper left hand to the lower right hand corner or apparently into the mouth of the bird. Before the slide is placed within the stereopticon, it is reversed or placed so that the image of the bird will appear top side up. This will cause the circular member 4 to drop to the position indicated in dotted lines (Fig. 1 of the drawings). When the slide is reversed, making the image of the bird appear upside down, and inserted into the stereopticon, the attraction of gravity will cause the movable circular member to roll down the incline of the diagonal channel 2' toward and into the open beak of the bird. The stereopticon will project the above described action onto the screen in a reversed position, making the image of the bird appear right side up and the worm will appear as if it were rolling up hill into the mouth of the bird. The heat of the stereopticon will have a tendency to fuse the viscous liquid when exposed thereto, thereby reducing the density of the said liquid and consequently reducing its tendency to retard the action of gravity upon the movable member 4, so that the movement of the movable member will be constantly accelerated and it will appear on the screen as if the image of the worm upon the said member was hurrying upward, faster and faster to its doom.

Fig. 4 of the drawings discloses a modification wherein the movable member 5 is rectangular in shape so that it will slide instead of rolling. On this rectangular member 5 I have shown an automobile. When this slide is placed in the stereopticon in the position shown in the drawings, the image on the screen will be reversed and it will appear as if the automobile were at the bottom of the incline and right side up. The member 5 will begin to move slowly downward in the slide, which movement will be reversed on the screen and it will appear as if the automobile were moving upward. As the heat from the stereopticon fuses the viscous liquid, the said liquid will become less dense and permit the member 5 to travel downward at a greater rate of speed. The effect on the screen will be that the automobile will start up the incline slowly and will increase in speed as it nears the top.

It is obvious from the foregoing that a great variety of images and combinations may be had with the stationary image on the slide and other images on the movable member.

Should the viscous liquid become hardened, a short exposure to the heat of the stereopticon, which is intense, will cause the fusion of the said liquid until its density is reduced to a state which will permit of the passage of the movable member therein.

The details of construction being so susceptible to variation, I do not wish to confine myself to the precise construction shown herein, but rather to avail myself of any modification that may fall properly within the scope of my invention.

Having thus described my invention what I claim as new and desire to secure by Letters Patent is;

1. A motion slide for stereopticons comprising parallel, transparent plates; and an inclosed channel, containing a viscous liquid and a movable member between the transparent plates.

2. A motion slide for stereopticons comprising parallel transparent plates; and a diagonal inclosed channel between the transparent plates containing a viscous liquid and a movable, transparent member having a transparent image thereon.

3. A motion slide for stereopticons comprising parallel, transparent plates having a transparent picture thereon; and a diagonal inclosed channel between the transparent plates containing a fusible, transparent viscous liquid and a movable, circular, transparent member having a transparent picture thereon.

In witness whereof I hereunto set my signature in the presence of two subscribing witnesses.

EARL L. GILMORE.

Witnesses:
ARTHUR WHITE,
JAMES F. McCUE.

Copies of this patent may be obtained for five cents each, by addressing the "Commissioner of Patents, Washington, D. C."